(12) United States Patent
Nakagawa et al.

(10) Patent No.: US 6,267,223 B1
(45) Date of Patent: Jul. 31, 2001

(54) FEEDER FOR ELECTRONIC CHIP COMPONENTS

(75) Inventors: Kiyoyuki Nakagawa, Takefu; Kenichi Fukuda, Sabae; Isamu Utsunomiya, Shiga-ken, all of (JP)

(73) Assignee: Murata Manufacturing Co., Ltd., Nagaokakyo (JP)

( * ) Notice: Subject to any disclaimer, the term of this patent is extended or adjusted under 35 U.S.C. 154(b) by 0 days.

(21) Appl. No.: 09/271,321

(22) Filed: Mar. 18, 1999

(30) Foreign Application Priority Data

Mar. 20, 1998 (JP) .................................................. 10-071548

(51) Int. Cl.$^7$ .................................................. B65G 47/14
(52) U.S. Cl. .................................................. 198/396
(58) Field of Search ............................. 198/396, 550.01, 198/550.2, 571

(56) References Cited

U.S. PATENT DOCUMENTS

| | | | |
|---|---|---|---|
| 3,470,218 | * | 7/1976 | Lee ..................................... 198/396 X |
| 4,201,313 | * | 5/1980 | Kirsch ............................... 198/396 X |
| 4,396,108 | * | 8/1983 | Sticht .................................... 198/396 |
| 4,462,508 | * | 7/1984 | Grafius .............................. 198/396 X |
| 4,766,991 | * | 8/1988 | Gherardi ........................ 198/550.2 X |

* cited by examiner

Primary Examiner—James R. Bidwell
(74) Attorney, Agent, or Firm—Burns, Doane, Swecker & Mathis, LLP

(57) ABSTRACT

At least one partition wall is disposed in a hopper of a feeder for feeding electronic chip components. The at least one partition wall reduces the potential for damage to the components due to the reciprocating movement of a movable pipe disposed on the bottom of the hopper for agitating the electronic chip components. The reduced potential of degradation allows more electronic chip components to be accommodated in the hopper.

19 Claims, 4 Drawing Sheets

FEEDER FOR ELECTRONIC CHIP COMPONENTS

This application corresponds to Japanese Patent Application No. 10-71548, filed on Mar. 20, 1998, which is hereby incorporated by reference in its entirety.

BACKGROUND OF THE INVENTION

1. Field of the Invention

The present invention relates to a feeder for feeding electronic chip components, and specifically to a feeder for feeding a plurality of randomly oriented electronic chip components in an aligned state.

2. Description of the Related Art

In order to feed electronic chip components such as capacitors, resistors, transistors, and filters, a plurality of randomly oriented electronic chip components are dispensed in an aligned state one by one using a feeder.

FIG. 7 illustrates a feeder 1 for feeding electronic chip components. This type of feeder is related to one aspect of the present invention.

The feeder 1 for feeding electronic chip components includes a hopper 3 for temporarily storing a plurality of randomly oriented electronic chip components 2. In the bottom of the hopper 3, a discharge opening 4 is formed. At the center of the discharge opening 4, a pipe 5 is formed in fixed fashion leaving a predetermined spacing between the pipe 5 and the inner periphery of the discharge opening 4. The fixed pipe 5 constitutes a portion of a conveying path 6 for leading (e.g., guiding) the electronic chip components 2 discharged from the discharge opening 4 in the aligned state. The inner diameter of the fixed pipe 5 is selected so as to be able to receive a chip component 2 only when a longitudinal direction of a chip component 2 agrees with the axial direction of the fixed pipe 5.

A movable pipe 7 is located between the inner periphery of the discharge opening 4 and the outer periphery of the fixed pipe 5. The movable pipe 7 surrounds the fixed pipe 5. The movable pipe 7 is driven so as to reciprocate in its axial direction as shown by a double-headed arrow 8. By the reciprocating movement of the movable pipe 7, electronic chip components 2 which are to be discharged from the discharge opening 4 are agitated such that electronic chip components 2 in the hopper 3 are smoothly moved and thereby led to the fixed pipe 5.

Among electronic chip components 2 in the hopper 3, only those which reach the top end of the fixed pipe 5 are received into the top opening of the fixed pipe 5, the received components 2 having orientations in a predetermined direction. The electronic chip components 2 in the fixed pipe 5 are guided in an aligned state. The conveying path 6, a portion of which is formed by the fixed pipe 5, is subsequently formed by a conveyer belt 10 circulating in the direction shown by an arrow 9. Therefore, the electronic chip components 2 discharged from the distal end of the fixed pipe 5 are subsequently conveyed by the conveyer belt 10 in the direction shown by arrow 9.

The electronic chip components 2 reaching the distal end of the conveying path 6 in this manner are picked up and held by a vacuum chuck 11, which constitutes a picking mechanism, so as to be mounted at a desired position on a wiring substrate, for example, by movement of the vacuum chuck 11.

In order to feed a plurality of kinds of electronic chip components 2 using the type of feeder 1 for electronic chip components described above, a plurality of feeding units 12 having hoppers 3 coupled to conveying paths 6 are disposed in parallel in the direction perpendicular to the plane of FIG. 7. The plurality of feeding units 12 are capable of reciprocating in unison in the direction shown by arrow 8. By the reciprocating movement, a feeding unit 12 feeds an electronic chip component 2 to the picking up position for the vacuum chuck 11.

The vacuum chuck 11 is controlled so as to reciprocate between two positions. At one end of the reciprocation, the electronic chip component 2 located at the distal end of the conveying path 6 of a specific feeding unit 12 is picked up, and then, at the other end of the reciprocation, this electronic chip component 2 is mounted at a desired position on a wiring substrate, for example.

In the feeder 1 for electronic chip-components formed as above, however, electronic chip components 2 in the hopper 3 undergo relatively intensive contact or collision, because of events like the following.

First, contact or collision of electronic chip components 2 can be attributed to the reciprocating movement of the movable pipe 7. That is, because of the reciprocating movement of the movable pipe 7, some electronic chip components 2 are in contact or collide with the movable pipe 7. Other electronic chip components 2 are in contact or collide with each other or with the inner surface of the hopper 3. This is caused by the agitation movement of the movable pipe 7. The greater the number of electronic chip components 2 in the hopper 3, the more shock caused by the contact or collision, which the electronic chip components 2 are affected by, because the weight of the electronic chip components 2 is cumulative in the bottom portion of the hopper 3.

Contact or collision of electronic chip components 2 can also be attributed to the starting and stopping of the movement of all the feeding units 12 in unison. That is, a feeding unit 12 is started and stopped every mounting operation, in general. The electronic chip components 2 accommodated in the hopper 3 repeat the contact or collision with each other or with the inner surface of the hopper 3 with each occurrence of starting and stopping. In order to increase the efficiency of the mounting process, the feeding unit 12 is rapidly moved and stopped under hard acceleration. This results in great shock to the electronic chip components 2 upon contact or collision as described above.

In order to smoothly guide electronic chip components in the hopper to the conveying path in an aligned state, the feeder for electronic chip components may be formed such that compressed air is jetted to electronic chip components in the hopper from outside (not shown), to agitate electronic chip components. In this case, electronic chip components also undergo contact or collision upon agitation.

Furthermore, in order to continue the mounting operation for a long time by reducing the frequency in which electronic chip components 2 are replenished in the hopper 3, each hopper 3 must accommodate a substantial number of electronic chip components 2. Therefore, among electronic chip components 2 in the hopper 3, there are chip components supplied to the mounting process after a relatively short stay in the hopper 3, while there are chip components that remain in the hopper 3 for a relatively long time. The electronic chip components 2 that remain for a long time in the hopper 3 undergo contact or collision many times resulting in potential quality deterioration. That is, there may be mechanical failure of electronic chip components 2 or degradation in solderability of outer electrodes of these chip components 2. When an electronic chip component 2 with deteriorated quality is mounted on a wiring substrate, the electronic chip component 2 is required to be replaced after mounting, thereby reducing productivity.

SUMMARY OF THE INVENTION

Accordingly, it is an object of the present invention to provide a feeder for feeding electronic chip components which reduces at least the above-mentioned problems.

In order to reduce the above-mentioned problems, a feeder for electronic chip components according to the present invention comprises a hopper for accommodating a plurality of electronic chip components having discharge opening in the bottom portion thereof and a conveying path for guiding the electronic chip components discharged from the discharge opening in an aligned state. The hopper has at least one partition wall disposed inside the hopper, wherein the partition wall is formed so as to divide the hopper into a plurality of regions which are associated with one another (e.g., which are connected to each other) for accommodating a plurality of electronic chip components.

According to another aspect of the invention, the above-mentioned at least one partition wall may be disposed so as to extend in the horizontal direction, or so as to extend in the vertical direction, or so as to extend at a non-zero angle with respect to a horizontal plane. A plurality of the partition walls may be provided. Further, the at least one partition wall may be capable of vibrating.

A feeder for electronic chip components according to the present invention may further comprise a fixed pipe disposed in the above-mentioned conveying path, and a movable pipe for agitating electronic chip components which are to be discharged from the discharge opening and for guiding the electronic chip components to the fixed pipe. The fixed pipe is formed in the center of the discharge opening leaving a predetermined spacing between the fixed pipe and the inner periphery of the discharge opening. The movable pipe is placed between the inner periphery of the discharge opening and the outer periphery of the fixed pipe so as to surround the fixed pipe. The movable pipe is driven so as to reciprocate in the axial direction thereof.

BRIEF DESCRIPTION OF THE DRAWINGS

The foregoing, and other, objects, features and advantages of the present invention will be more readily understood upon reading the following detailed description in conjunction with the drawings in which.

DESCRIPTION OF THE PREFERRED EMBODIMENTS

Figure 5:
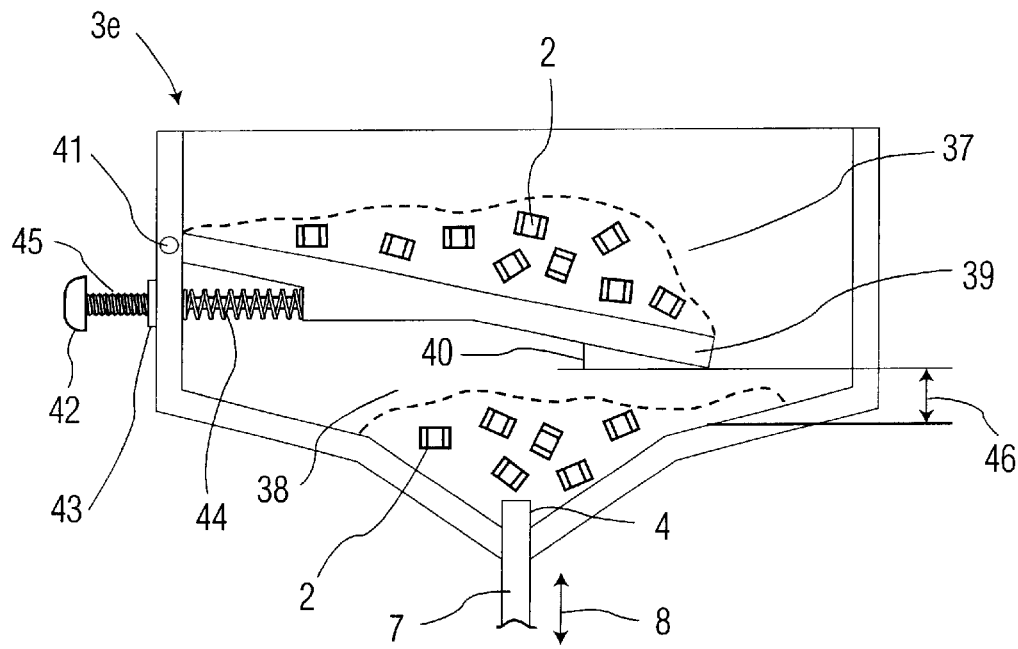
FIG. 5 is a cross-sectional view showing a hopper 3e of a feeder for feeding electronic chip components according to a fifth embodiment of the present invention.
Figure 6:
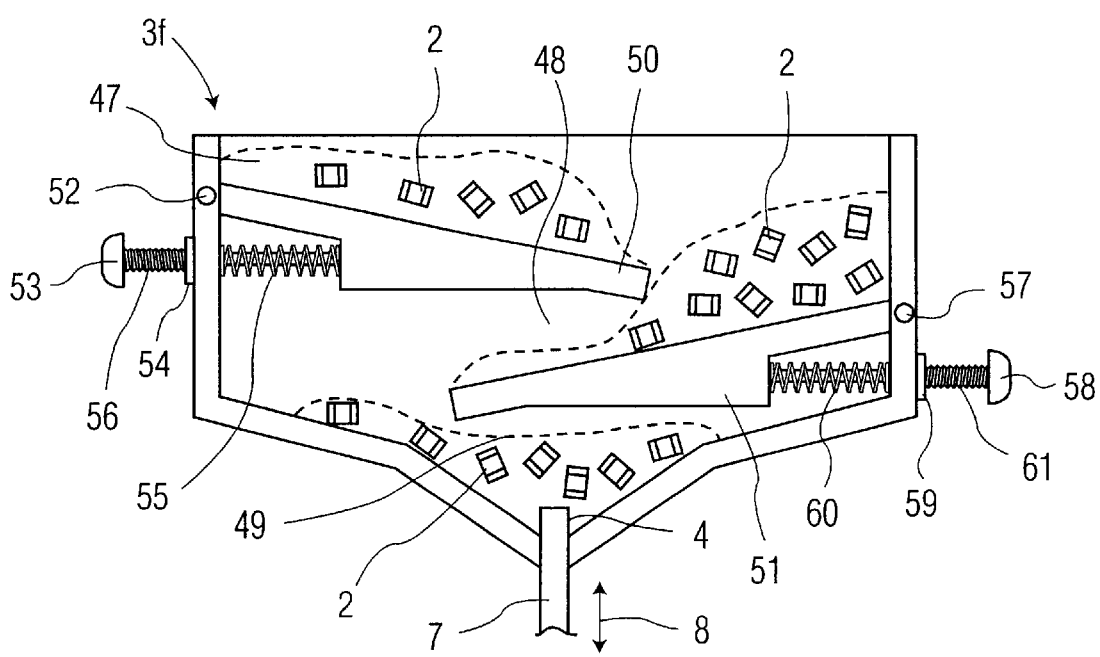
FIG. 6 is a cross-sectional view showing a hopper 3f of a feeder for feeding electronic chip components according to a sixth embodiment of the present invention.
Figure 7:
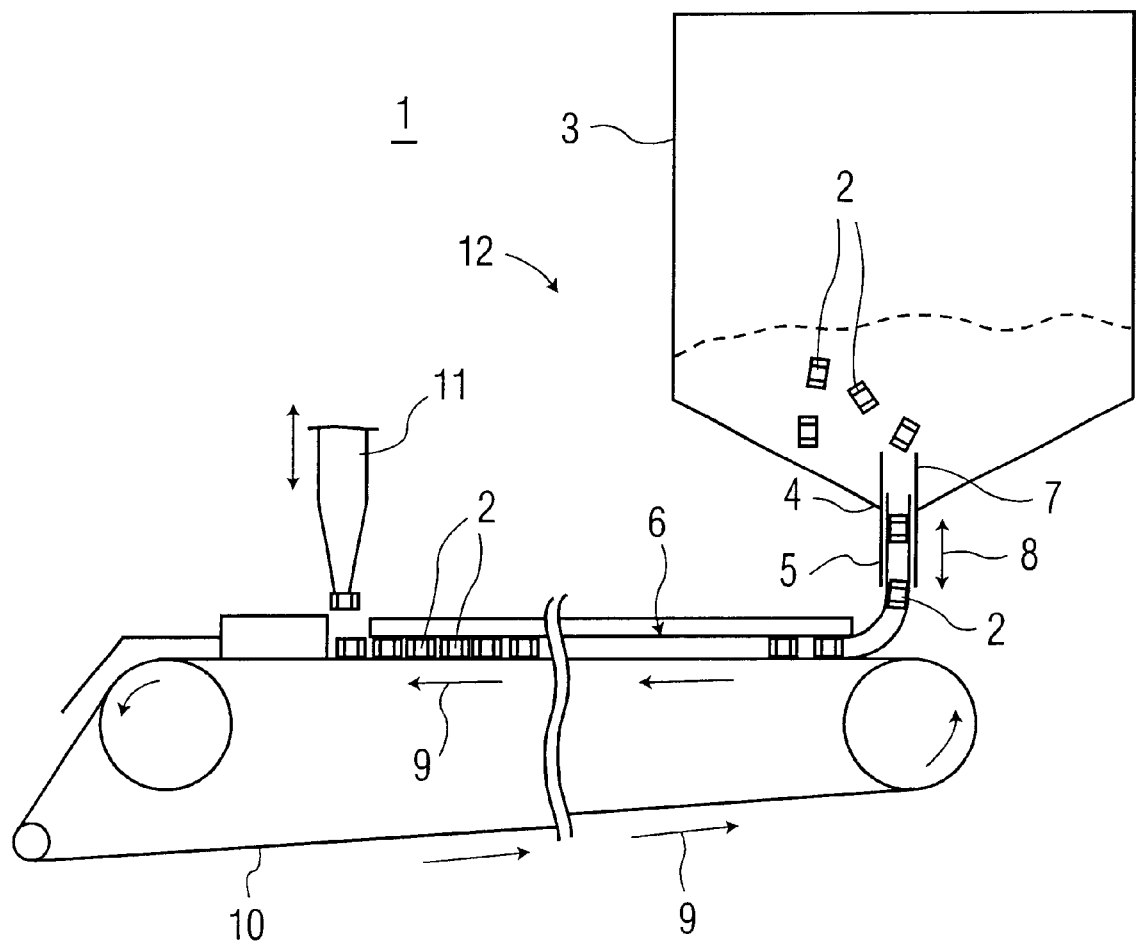
FIG. 7 is a front view diagram illustrating the schematic configuration of a feeder 1 for feeding electronic chip components, the feeder being related to the present invention.

FIGS. 1 to 6 are cross-sectional views showing hoppers corresponding to the aforementioned hopper shown in FIG. 7 to illustrate exemplary feeders for feeding electronic chip components according to each of the embodiments of the present invention. These feeders for feeding electronic chip components according to the embodiments are similar to the feeder 1 for feeding electronic chip components shown in FIG. 7, with the exception that the hoppers shown in FIGS. 1 to 6 are different than the hopper 3 shown in FIG. 7. Therefore, referring to FIGS. 1 to 6, elements already discussed above are given the same reference numerals used in FIG. 7, and discussion thereof will be omitted.

Figure 1:
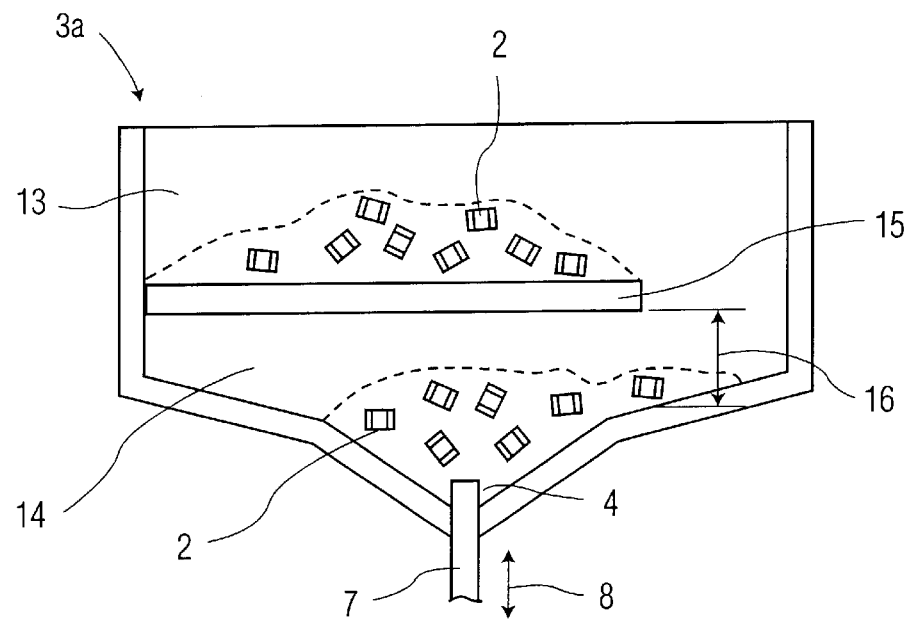
FIG. 1 is a cross-sectional view showing a hopper 3a of a feeder for feeding electronic chip components according to a first embodiment of the present invention.

In a hopper 3a shown in FIG. 1, a partition wall 15 for accommodating a plurality of electronic chip components 2 is formed so as to horizontally extend and to divide the inside of the hopper 3a into two regions 13, 14, which are associated with each other (e.g., which are connected to other). In the region 13 formed above the partition wall 15, a plurality of electronic chip components 2 are accommodated in preparation to be fed to the region 14 from region 13.

It is preferable that almost the entire amount of electronic chip components 2 in the region 14 be discharged from the discharge opening 4 before the components in region 14 are replenished. This will reduce the amount of deterioration in quality which the components are subjected to, caused by, for instance, the effect of the reciprocating movement of the movable pipe 7 on the components. At the same time, sufficient components 2 should be supplied to the region 14 to satisfy desired dispensing rates for the components 2.

The number of electronic chip components 2 supplied to the region 14 from the region 13 depends on the gap 16 between the partition wall 15 and the inner surface of the hopper 3a, for example. When dimensions of an electronic chip component 2 are approximately 3.2 mm×1.6 mm×1.25 mm, for example, it is preferable that the gap 16 range from approximately 8 mm to 20 mm.

Since the partition wall 15 is disposed so as to horizontally extend into the hopper 3a, electronic chip components 2 on the partition wall 15 cannot drop below into the region 14 in an unrestricted manner. However, since the feeding units 12, as shown in FIG. 7 described above, are moved and stopped in unison during the feeding operation, acceleration due to this starting and stopping exerts an inertial force on electronic chip components 2, causing the components to drop from the partition wall 15 into region 14.

As a modified embodiment of the embodiment shown in FIG. 1, at least one partition wall other than the partition wall 15 may be disposed in parallel with the partition wall 15. The vertical position (e.g., the position along the depth of the hopper 3a) of this additional partition wall would be different from the wall 15. Further, the gap formed by this additional partition wall would be disposed on a different side of the hopper 3a than the gap 16.

Figure 2:
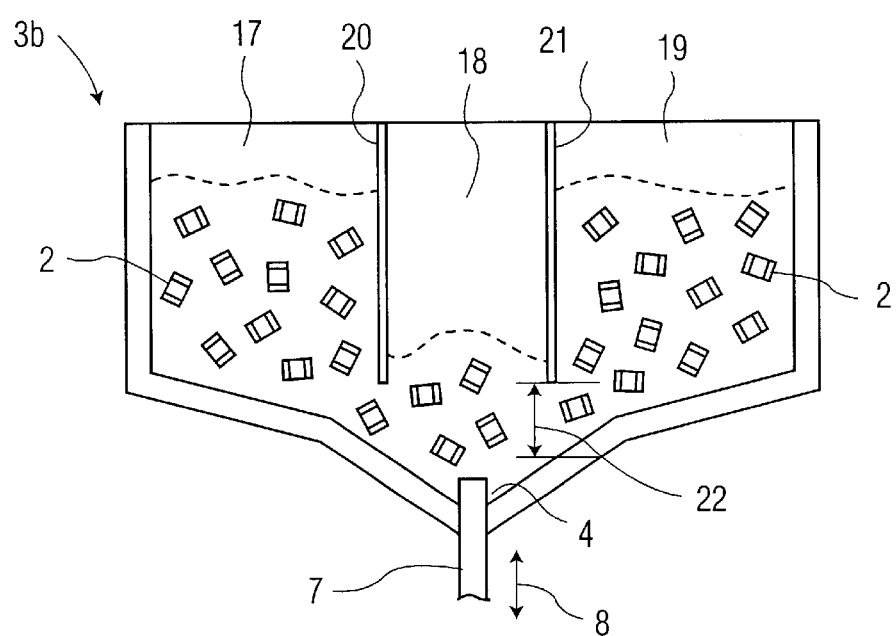
FIG. 2 is a cross-sectional view showing a hopper 3b of a feeder for feeding electronic chip components according to a second embodiment of the present invention.

In a hopper 3b shown in FIG. 2, two partition walls 20, 21 for accommodating a plurality of electronic chip components 2 are formed so as to vertically extend into and to divide the inside of the hopper 3b into three regions 17, 18, and 19 which are associated with each other (e.g., which are connected to each other).

In this embodiment, the dimension of a gap 22 is also adjusted so as to regulate the number of electronic chip components 2 supplied to the region 18 from the region 17 or 19. In this embodiment, when an electronic chip component 2 is comparatively large with dimensions such as approximately 3.2 mm×1.6 mm×1.25 mm, it is also preferable that the gap 22 range from approximately 8 mm to 20 mm. When the gap 22 is below 5 mm, for example, electronic chip components 2 may bridge the gap 22, thereby undesirably blocking the gap 22.

As a modified embodiment of the embodiment shown in FIG. 2, one of the partition walls 20, 21 may be eliminated.

Figure 3:
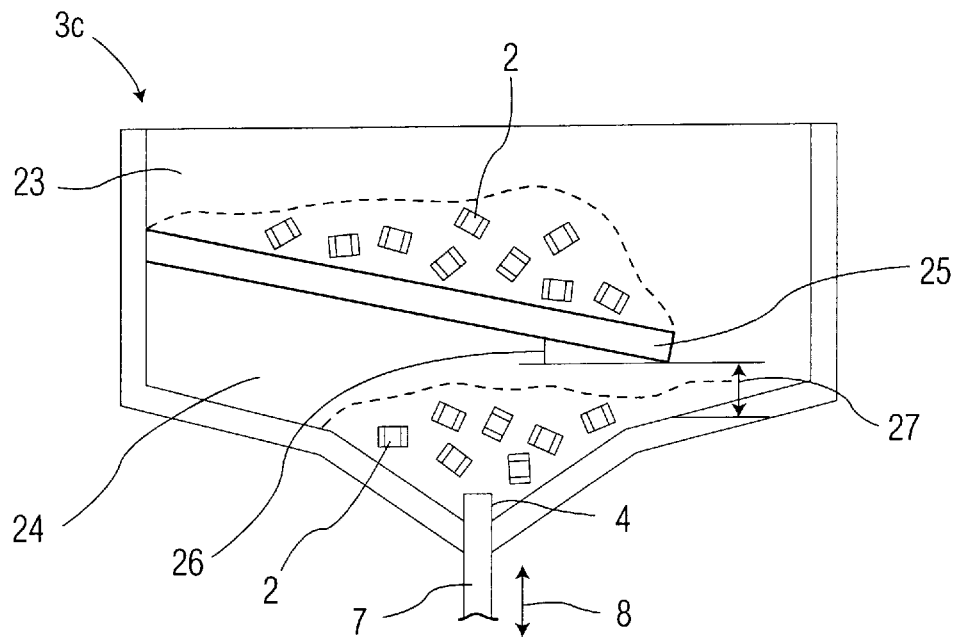
FIG. 3 is a cross-sectional view showing a hopper 3c of a feeder for feeding electronic chip components according to a third embodiment of the present invention.

In a hopper 3c shown in FIG. 3, a partition wall 25 is formed for accommodating a plurality of electronic chip components which extends at a slanted angle of inclination 26 with respect to the horizontal plane and which divides the inside of the hopper 3c into two regions 23, 24 which are associated with each other (e.g., which are connected to each other).

In this embodiment, electronic chip components 2 in the region 23 above the partition wall 25 slide down along the partition wall 25 by gravitational force to the region 24 underneath through a gap 27.

The number of electronic chip components 2 supplied to the region 24 from the region 23 can be regulated by changing the dimension of the gap 27 or the angle of inclination 26. More specifically, when dimensions of an electronic chip component 2 are approximately 3.2 mm×1.6 mm×1.25 mm, for example, it is preferable that the gap 27 range from approximately 8 mm to 20 mm.

The angle of inclination 26, on the other hand, should be selected above an angle at which electronic chip components 2 begin to slide down on the partition wall 25 (repose angle). More specifically, it is preferable that the angle 26 range from approximately 10° to 30°.

However, as described above, due to the acceleration (inertia force) at the starting and stopping of all of the feeding units 12 shown in FIG. 7, electronic chip components 2 can in fact slide down on the partition wall 25 even when the angle of inclination 26 is smaller than the above-stated range.

Figure 4:
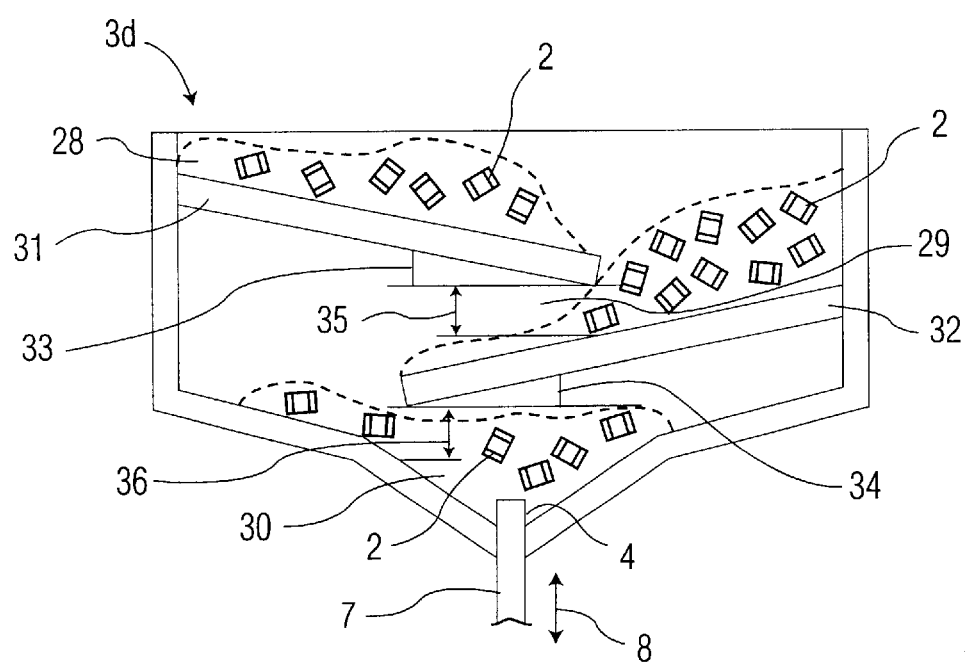
FIG. 4 is a cross-sectional view showing a hopper 3d of a feeder for feeding electronic chip components according to a fourth embodiment of the present invention.

In a hopper 3d shown in FIG. 4, two partition walls 31, 32 for accommodating a plurality of electronic chip components 2 are formed so as to extend at slanted angles of inclination 33, 34 with respect to the horizontal plane, respectively and to divide the inside of the hopper 3d into three regions 28, 29, and 30 which are associated with each other (e.g., which are connected to each other), and such that the vertical position of the partition wall 31 is different from that of the partition wall 32.

In this embodiment, electronic chip components 2 in the region 28 above the partition wall 31 move down to the region 29 between the partition walls 31 and 32 through a gap 35. Then, the components 2 move down to the region 30 underneath the partition wall 32 through a gap 36.

In this embodiment, the number of electronic chip components 2 supplied to the region 29 from the region 28 and supplied to the region 30 from the region 29 can be regulated by changing the angles of inclination 33 and 34 and the dimensions of the gaps 35 and 36, respectively, as in the embodiment shown in FIG. 3. These angles of inclination 33 and 34 and the dimensions of the gaps 35 and 36 can be selected to be the same as the angle of the inclination 26 and the dimension of the gap 27, as discussed above with respect to FIG. 3.

In this embodiment, since electronic chip components 2 can be stored by dividing them into three regions 28 to 30, the entire number of electronic chip components 2 in the hopper 3d can be increased. At the same time, the number of electronic chip components 2 stored in each of the regions 28 to 30 is not so great.

As for the embodiment shown in FIG. 4, the number of partition walls may be further increased. The number of partition walls may be changed particularly depending on the height of the hopper 3d. That is, a hopper 3d that extends a greater distance in the height direction can accommodate more partition walls.

In a hopper 3e shown in FIG. 5, as in the embodiment shown in FIG. 3, a partition wall 39 for accommodating a plurality of electronic chip components 2 is formed so as to extend at a slanted angle of inclination 40 with respect to the horizontal plane and to divide the inside of the hopper 3e into two regions 37, 38, which are associated with each other (e.g., which are connected to each other). An additional feature of this embodiment is that the partition wall 39 can vibrate.

More specifically, the partition wall 39 is connected to the hopper 3e via a pivotal mounting pin 41, so that the partition wall 39 can rotate about the pin 41. An end of a screw shaft 42 exerts force on the partition wall 39. The screw shaft passes through the wall of the hopper 3e. Using this mechanism, the screw shaft 42 is integrated with the partition wall 39, and an appropriate play is applied to the screw shaft 42 penetrating the wall of the hopper 3e in order to permit rotation or vibration of the partition wall 39 about the pivotal mounting pin 41.

A washer 43 is disposed on the screw shaft 42 and also outside of the side wall of the hopper 3e. The washer 43 can be displaced on the screw shaft 42. A first coil spring 44 is disposed on the screw shaft 42 and also between the side wall of the hopper 3e and the partition wall 39. This coil spring 44 acts as a compression spring. A second coil spring 45 is disposed between the head of the screw shaft 42 and the washer 43. This spring 45 also acts as a compression spring.

In this configuration, the partition wall 39 is maintained in an equilibrium state in which forces of the first spring 44 and the second spring 45 are balanced when no outer force is applied to the partition wall 39. When an outer force is applied to the partition wall 39, the partition wall 39 vibrates. The center of vibration is centered around the pivotal mounting pin 41. The vibration alternately repeats the cycle of the compression of the first coil spring 44 and the extension of the second coil spring 45, and the extension of the first coil spring 44 and the compression of the second coil spring 45, centered around the above-mentioned equilibrium state.

The outer force causing the above-mentioned vibration of the partition wall 39 may be due to the acceleration (inertia force) when all of the feeding units 12 as shown in FIG. 7, for example, start and stop. More specifically, when a predetermined acceleration is applied to a feeding unit 12, the partition wall 39 will vibrate due to inertial forces applied to the partition wall 39.

In this embodiment, electronic chip components 2 located in the region 37 above the partition wall 39 also enter the region 38 (disposed beneath region 37) through a gap 46. About 10° to 30° may be selected, for example, as an angle of inclination 40 of the partition wall 39 in the equilibrium state, as in the embodiment of FIG. 3. Since the partition wall 39 vibrates in this embodiment, electronic chip components 2 on the partition wall 39 move more smoothly. This makes it possible to use a smaller angle of inclination 40.

This enables more electronic chip components 2 to be accommodated in the hopper 3e.

In the embodiment shown in FIG. 5, the distance between the head of the screw shaft 42 and the partition wall 39 can be changed by rotating the screw shaft 42 to change the values of the spring constants of the first and second coil springs 44 and 45, respectively, and to simultaneously adjust the angle of inclination 40.

In a hopper 3f shown in FIG. 6, two partition walls 50, 51 for accommodating a plurality of electronic chip components 2 are formed. The vertical positions of these two partition walls 50, 51 are different. These partition walls 50, 51 divide the inside of the hopper 3f into three regions 47, 48, and 49 which are associated with one another (e.g., which are connected to each other). These partition walls 50, 51 can vibrate in a similar manner to that described above with respect to FIG. 5. Therefore, a more detailed description of the vibration mechanism is omitted. To summarize, the embodiment shown in FIG. 6 employs a pivotal mounting pin 41, screw shaft 42, washer 43, first coil spring 44, and second coil spring 45, whereas the embodiment shown in FIG. 7 employs a pivotal mounting pin 52, a screw shaft 53, a washer 54, a first coil spring 55, and a second coil spring 56 associated with the partition wall 50, and a pivotal mounting pin 57, a screw shaft 58, a washer 59, a first coil spring 60, and a second coil spring 61 associated with the partition wall 51.

In this embodiment, more electronic chip components 2 can be accommodated while still producing acceptable levels of quality degradation. Further, with this embodiment, the number of electronic chip components 2 fed from the region 47 through the region 48 to the region 49 can be more finely adjusted, compared with the embodiment shown in FIG. 5.

Although a description has been given of specific embodiments of the present invention shown in the drawings, various other modifications can be made within the scope of the present invention.

For example, the above embodiments employ the reciprocating pipe 7 for agitating the components 2 and for smoothly discharging the components 2 from the hoppers 3a to 3f in an aligned manner. But compressed air may be jetted from outside the hopper to agitate electronic chip components 2 in the hopper. The compressed air can serve as a substitute for the pipe 7 or can supplement the pipe 7.

As described above, according to the present invention, a hopper is provided for accommodating a plurality of electronic chip components to be discharged to a conveying path in an aligned state. A partition wall is disposed in the hopper for accommodating a plurality of electronic chip components. The wall is formed so as to divide the hopper into a plurality of regions which are associated with one another. Due to this configuration, the number of electronic chip components in a region leading to the discharge opening of the hopper can be limited while the number of electronic chip components in the entire hopper can be maintained at adequate levels. Accordingly, almost all of the electronic chip components in the region leading to the discharge opening can be discharged before undergoing any deterioration in quality, despite the fact that an agitation force is applied to these components.

The above-described configuration results in a reduced probability of feeding and mounting an electronic chip component having deteriorated quality. This results in a consequent improvement in productivity by reducing process losses such as production of failed wiring substrates and replacement of electronic chip components already mounted on wiring substrates.

According to the present invention, even if a large number of electronic chip components are accommodated in the hopper, the weight of all the electronic chip components is not cumulative at the bottom portion of the hopper because the partition wall (or walls) distribute the load. Therefore, the shock affecting the electronic chip components caused by the contact or collision can be reduced, especially in the bottom portion of the hopper. This reduces the quality degradation of electronic chip components.

According to the present invention, when the partition wall is formed so as to extend with respect to the horizontal plane in a slanted manner, electronic chip components can more smoothly move along the partition wall to be smoothly fed to the region leading to the discharge opening.

According to the present invention, when the partition wall is formed so as to vibrate, electronic chip components can smoothly move along the partition wall. The advantages of this embodiment are similar to the case of the above-mentioned slanting partition wall.

According to the present invention, when a plurality of partition walls are formed, the number of regions for accommodating electronic chip components increases in the hopper. This increases the entire number of electronic chip components that can be accommodated in the hopper without increasing the damage to the components.

In a feeder for electronic chip components according to the present invention, a feeder comprises a fixed pipe disposed in the conveying path, and a movable pipe for agitating electronic chip components which are to be discharged from the discharge, opening of the hopper and for guiding the electronic chip components to the fixed pipe. The fixed pipe is formed in the center of the discharge opening, leaving a predetermined spacing between the fixed pipe and the inner periphery of the discharge opening. The movable pipe is placed between the inner periphery of the discharge opening and the outer periphery of the fixed pipe, such that the movable pipe surrounds the fixed pipe. The movable pipe is driven so as to reciprocate in the axial direction thereof. The movable pipe has an impact on the electronic chip components in the region leading to the discharge opening. Accordingly, the advantages presented by the present invention will be particularly useful in this apparatus. That is, a large number of electronic chip components in the region leading to the discharge opening can be discharged before undergoing any deterioration in quality because of the role of the partition wall(s), despite the potentially damaging effects of the reciprocating movement of the movable pipe.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A feeder for feeding electronic chip components, comprising:

hopper for accommodating a plurality of electronic chip components, said hopper having a discharge opening in a bottom portion thereof, wherein said components advance in a vertical direction through said hopper by force of gravity into said discharge opening;

a conveying path for guiding the electronic chip components discharged from the discharge opening in a state of alignment;

at least one partition wall disposed inside said hopper so as to divide said hopper into a plurality of first and second regions which are associated with one another, said plurality of first and second regions accommodating said plurality of electronic chip components;

a stationary pipe disposed in said conveying path; and a movable pipe for agitating electronic chip components which are to be discharged from said discharge opening and for guiding the electronic chip components to said stationary pipe.

2. A feeder according to claim 1, wherein said at least one partition wall is disposed so as to extend in a horizontal plane.

3. A feeder according to claim 2, wherein said at least one partition wall comprises a plurality of partition walls which are disposed so as to extend in a horizontal plane.

4. A feeder according to claim 1, wherein said at least one partition wall is disposed so as to extend in the vertical direction.

5. A feeder according to claim 4, wherein said at least one partition wall comprises a plurality of partition walls which are disposed so as to extend in the vertical direction.

6. A feeder according to claim 1, wherein said at least one partition wall is disposed so as to extend at a slanting non-zero angle with respect to a horizontal plane.

7. A feeder according to claim 6, wherein said angle is between approximately 10° and 30°.

8. A feeder according to claim 6, wherein said at least one partition wall comprises a plurality of partition walls which are disposed so as to extend at a slanting non-zero angle with respect to a horizontal plane.

9. A feeder according to claim 1, further including a mechanism for applying vibrations to said at least one partition wall.

10. A feeder according to claim 9, wherein said at least one partition wall is pivotally mounted to a wall of said hopper.

11. A feeder according to claim 9, wherein said mechanism for applying vibrations comprises:

a shaft extending through said hopper, such that a first portion of said shaft is outside of said hopper and a second portion of said shaft is inside said hopper, wherein a distal portion of said second portion of said shaft is coupled to said at least one partition wall.

12. A feeder according to claim 11, further comprising:

a first spring coupled to said first portion of said shaft; and a second spring coupled to said second portion of said shaft.

13. A feeder according to claim 11, wherein said shaft is a screw shaft.

14. A feeder according to claim 1, wherein said at least one partition wall has a distal portion which is separated from a bottom wall of said hopper by a gap between approximately 8 mm to 20 mm.

15. A feeder according to claim 1, wherein said stationary pipe is disposed in the center of the discharge opening leaving a predetermined spacing between said stationary pipe and the inner periphery of the discharge opening.

16. A feeder according to claim 1, wherein said movable pipe is placed between the inner periphery of the discharge opening and the outer periphery of said stationary pipe so that said movable pipe surrounds said stationary pipe, wherein said movable pipe is driven so as to reciprocate in the axial direction thereof.

17. A hopper for use in a feeder for feeding electronic chip components, comprising:

a discharge opening in a bottom portion of said hopper, wherein said components advance in a vertical direction through said hopper by force of gravity into said discharge opening;

first and second partition walls disposed inside said hopper so as to divide said hopper into a first, second and third region which are associated with one another, said first, second and third region accommodating said plurality of electronic chip components, wherein the first partition wall is disposed so as to extend from a first side of the hopper at a slanting non-zero angle with respect to the horizontal and the second partition wall is disposed so as to extend from a second side of the hopper at a slanting non-zero angle with respect to the horizontal;

a first gap between the first partition wall and the second partition wall; and a second gap between the second partition wall and the bottom portion of the hopper, wherein a size of the first gap regulates a number of said components supplied from the first region to the second region and a size of the second gap regulates a number of said components supplied from the second region to the third region.

18. A hopper for use in a feeder for feeding electronic chip components, comprising:

a discharge opening in a bottom portion of said hopper, wherein said components advance in a vertical direction through said hopper by force of gravity into said discharge opening; and at least one partition wall disposed inside said hopper so as to divide said hopper into a plurality of regions which are associated with one another, said plurality of regions accommodating said plurality of electronic chip components;

a stationary pipe disposed in said conveying path; and a movable pipe for agitating electronic chip components which are to be discharged from said discharge opening and for guiding the electronic chip components to said stationary pipe, wherein said at least one partition wall serves to reduce the number of electronic chip components which are located in said bottom portion of said hopper where said electronic components are subject to agitation produced by the feeder.

19. A hopper for use in a feeder for feeding electronic chip components, comprising:

a discharge opening in a bottom portion of said hopper, wherein said components advance in a vertical direction through said hopper by force of gravity into said discharge opening;

a partition wall disposed inside said hopper so as to divide said hopper into a first and second region which are associated with one another, said first and second region accommodating said plurality of electronic chip components, wherein the partition wall is disposed so as to extend in a horizontal plane; and a gap between the partition wall and the bottom portion of the hopper, wherein a size of the gap regulates a number of said components supplied from the first region to the second region.

* * * * *